Oct. 18, 1966  K. V. KORDESCH ET AL  3,279,950
METHOD OF USING SOLID ORGANIC FUELS IN A FUEL CELL
Filed Aug. 20, 1962

INVENTORS
KARL V. KORDESCH
JAMES O. KOEHLER
BY John R. Haherty
ATTORNEY

3,279,950
METHOD OF USING SOLID ORGANIC FUELS IN A FUEL CELL
Karl V. Kordesch, Lakewood, and James O. Koehler, Parma Heights, Ohio, assignors to Union Carbide Corporation, a corporation of New York
Filed Aug. 20, 1962, Ser. No. 218,183
6 Claims. (Cl. 136—86)

This application is a continuation-in-part of our application Serial No. 5,771, filed February 1, 1960, and now abandoned, and we rely on only those portions of application Serial No. 5,771 which relate to the use of solid organic fuels in fuel cells as disclosed and claimed herein.

The invention relates to a fuel cell, and particularly to a fuel cell and an organic fuel which in combination produce electricity without requiring a large amount of weight and space.

A fuel cell may be considered as a primary galvanic cell, the basic reaction of which is the electrochemical oxidation of a fuel. The cells usually comprise a casing, a number of gas permeable, substantially inert anodes and cathodes in the casing, an electrolyte electrochemically connecting the anodes and cathodes, and supply means connected with each electrode on its side opposite the electrolyte for providing a continuous supply of gaseous fuel to the anodes and gaseous oxidant to the cathodes. The reactive gases diffuse through the electrodes to the electrolyte and then react electrochemically to provide an electric potential between the anodes and cathodes.

In the past, hydrogen has usually been used as the fuel, and oxygen or air as the oxidant, especially in cells which operate at low temperatures. These materials are readily available, and are relatively easy to handle. The hydrogen is stored in tanks, cylinders, or other generally voluminous containers, and then easily supplied to the electrodes through conduit means. Such an arrangement is practical in laboratory experiments and many commercial applications, but for some applications where space and weight are critical, the provision of hydrogen in this manner is not desirable due to the space required to store hydrogen gas and due to the weight of the pressure cylinders required to store the hydrogen if it is compressed.

The main object of the invention, therefore, is to provide new and economically advantageous means for supplying hydrogen to fuel cells of the character described so as to render such cells portable.

An equally important object is to provide a fuel cell which will effect a hydrogen-producing reaction at the negative electrode, and will use the hydrogen thus produced in the nascent state without passing through a molecular phase.

Another object of the invention is the provision of a fuel cell with minimum overall weight and space requirements.

Figure 1:
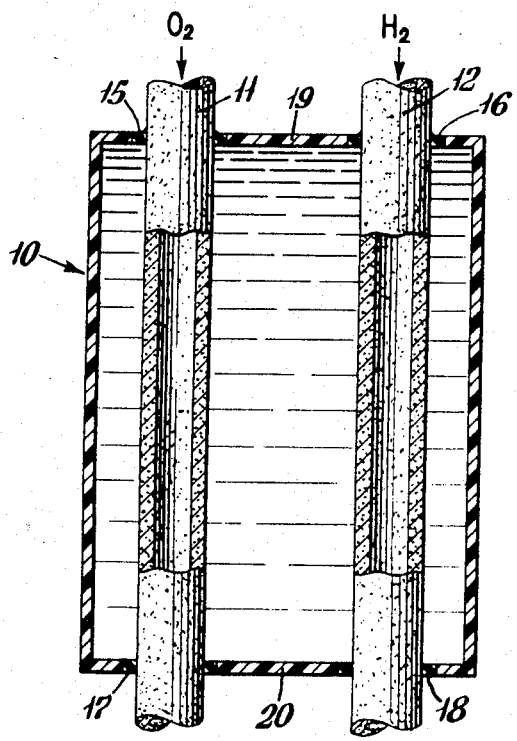
Figure 2:
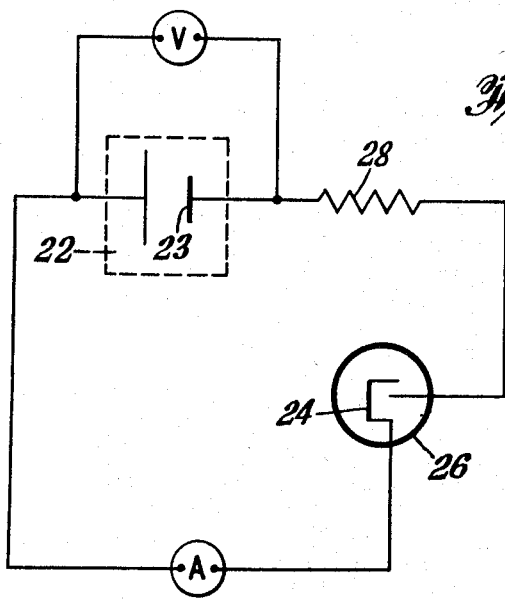

In the drawings:
FIG. 1 is a front elevational view in section of a fuel cell employing the fuels of the invention; and
FIG. 2 is a schematic view of the circuit used in evaluating fuels of the invention.

Broadly, the invention comprises making the anode in the known fuel cells of active carbon at least on the active surfaces thereof and depositing thereon a catalyst selected from the group consisting of the platinum family metals, iron, nickel, and mixtures thereof to the extent of about ¼ to 8 milligrams per square centimeter of apparent electrode surface area, and then supplying directly to the anode a solid organic fuel (dissolved in water) which by dissociation will provide hydrogen ions without hydrogen molecules at the surface of the anode. The preferred sources of hydrogen include sugar and pentaerythritol. The combination of the anode specified above with the defined organic fuels having labile hydrogens provides a convenient means for providing hydrogen to a fuel cell for reaction with oxygen to form water. These same fuels, however, when used with other electrodes known in the art, do not provide the outstanding operating characteristics produced by the anode and fuels of the invention.

Thus, the invention may also be defined as a fuel cell comprising an anode made as defined above, an oxygen cathode, an electrolyte electrochemically connecting the anode and cathode, an external circuit between the anode and cathode, oxygen in supply of the cathode, and in direct supply of the anode a solid organic fuel which electrochemically combines with oxygen to form water. Such a cell, including the storage tanks for the reactive materials, requires a minimum of weight and space when compared with a cell operating on gaseous hydrogen and oxygen.

Referring now to the drawing, the cells for which the fuels of the invention are suitable are of the type shown generally in FIG. 1. Typically, such a cell comprises a container 10 having an alkaline electrolyte therein and a hollow porous carbon cathode 11 and anode 12 immersed in the electrolyte. The cell electrodes pass through end covers 19 and 20 of container 10 and are secured thereon by circular seals 15, 16, 17 and 18. Suitable conduits (not shown) introduce oxygen and hydrogen, respectively, through the cathode 11 and anode 12. In the practice of the invention, the hydrogen is introduced in the form of a water solution of a solid organic fuel having a labile hydrogen.

The cell electrodes are preferably made in the following manner:

A mixture of carbon black and pitch, such as 100 parts carbon black and 63 parts soft pitch along with 3 parts fuel oil, is formed into shells and then baked at about 1000° C. for about 6 hours. The raw tubes have a porosity of about 18 to 20 percent (measured by water saturation). The porosity is then increased to about 25 percent by exposing the shells to carbon dioxide at 800 to 1000° C. for 1 to 36 hours, or to steam at the same temperature for a period between 10 minutes and three hours. Carbon plate electrodes can be made in a similar manner.

Next, a spinel catalyst solution, which is preferably a 0.1 molar solution of cobaltous nitrate [$Co(NO_3)_2 \cdot 6H_2O$] and aluminum nitrate [$Al(NO_3)_3 \cdot 9H_2O$], is applied to the electrodes and decomposed by heat to form the pyrolysis product, which is probably a true spinel, $CoO \cdot Al_2O_3$, on the carbon surfaces. The decomposition is preferably conducted in an oxidizing atmosphere, such as carbon dioxide, and at a temperature between about 850° C. and 950° C. The nitrogen oxides produced during the nitrate decomposition oxidize the electrodes and thereby increase the porosity of the electrodes to about 30 to 35 percent. At this point, the carbon tubes contain catalysts suitable for promoting oxygen dissociation.

The spinel deposition described above is fully explained in patents to A. Marko and K. Kordesch, U. S. Patent No. 2,615,932 and U.S. Patent No. 2,669,598 which issued on October 28, 1952, and February 16, 1954, respectively. Briefly, the process comprises impregnating a gas-permeable body, preferably made of an activated carbon, with a solution of at least one heat-decomposable salt of a heavy metal selected from the group consisting of iron, cobalt, nickel, manganese, chromium, copper, silver, gold, platinum, vanadium, titanium, uranium, thorium, and the rare earths, and at least one heat-decomposable salt of aluminum, and then heating the impregnated body to a temperature at which the salts decompose to form a catalyst. The spinels are insoluble in caustic electrolytes, and are at least partially conductive, which helps to minimize the resistance of an electrode as compared with other materials which are non-conductive.

In general, approximately stoichiometric amounts of the above salts are preferred so that a true spinel structure in the pyrolysis product is formed. The type of salt which is employed is not critical, but it should be one which decomposes without too much difficulty, and which possesses oxidizing properties. Nitrates and nitrites, i.e., the salts of nitric or nitrous acids, are preferred. Other salts which may be employed include those of chloric acid, chromic acid, oxalic acid, acetic acid, and formic acid. The temperature at which the spinels are formed is, in general, at least about 700° C., and usually lies between about 700° C. and 950° C. It has also been found that a spinel catalyst made from cobalt and aluminum salts provides the best catalytic action with respect to fuel cell reactions, especially since this catalyst is relatively insoluble in caustic electrolytes. Preferably, the spinels are deposited from a 0.1 molar solution.

Next, a 10 percent aqueous solution of chloroplatinic acid ($H_2PtCl_6 \cdot 6H_2O$), rhodium trichloride ($RhCl_3$), or similar compounds is painted on the carbon shells which are to be used as anodes in the cell of the invention, and then thermally decomposed to the corresponding metal catalyst at a temperature below 200° C. Ten milliliters of such a solution are necessary to produce a (calculated) surface coverage of 2 mg. of metal per $cm.^2$ on a 12-inch long, ¾″ O.D. electrode. The decomposition is usually performed in air, but a reducing (hydrogen) atmosphere may be advantageous if the electrode material tends to oxidize at temperatures below 200° C.

The metal catalyst may be one of the transition metals of Group VIII of the Periodic Table, or mixtures thereof. Broadly, the metal catalyst is deposited on the anode body by coating a salt of the platinum family metal or other metal on the body and then heating, preferably in a non-oxidizing atmosphere, to decompose the salt and deposit the metal catalyst in an active form. The exact state of the metal catalyst is not known, but it probably exists as either a pure metal, a suboxide, or a constituent of a complex catalyst consisting of it and the spinel. It was found, however, that the activity of the metal catalyst was reduced if it was deposited at temperatures higher than 200° C. In this regard, the presence of the spinel is advantageous since it helps to promote the decomposition of the salt of the metal catalyst at temperatures below 200° C. Ordinarily, the salt must be heated to over 300° C. for proper decomposition in the absence of promoters, and such high temperatures tend to cause undesirable sintering and deactivation of the metal catalyst.

The platinum family metals, i.e., platinum, palladium, iridium, ruthenium, osmium, and rhodium, are preferred as the metal catalyst, but iron and nickel are also suitable, especially for high temperature operation. Rhodium has the distinct advantage of not being poisoned by sulfur compounds or by cyanides, which are oftentimes introduced into the electrode body during manufacture. Mixtures of rhodium and palladium are the preferred metal catalysts for the anode of the invention. The mixture can consist of from 20 to 80 percent by weight rhodium and from 80 to 20 percent palladium.

The particular salt of these metals for use in the impregnation step is not critical, but it must be capable of decomposition below about 200° C. to form the metal catalyst. Chloroplatinic acid and rhodium trichloride are examples of suitable salts.

The concentration of the spinel catalyst is preferably within about 0.05 and about 0.2 weight percent spinel based on the weight of the electrode material, such as carbon, and the concentration of metal catalyst is preferably within about ¼ and 8 milligrams of metal catalyst per apparent square centimeter of surface area. Concentrations of about 0.1 weight percent spinel and about 2 mg./$cm.^2$ of metal catalyst are found to be the most active.

In the practice of the invention, the solid organic fuels, dissolved in water, are introduced directly into the anodes of the fuel cell, wherein through an electrochemical reaction initiated, catalyzed, or accelerated by the catalysts present therein, the fuels dissociate into hydrogen ions with the simultaneous release of electrons.

Table I below summarizes the performance at 57° C. of various fuels employed in a fuel cell according to the method of this invention. These data were obtained using the circuit shown on FIG. 2, wherein the test cell 22 had a positive electrode 23 consisting of a manganese dioxide liner instead of a carbon tube. The rest of the circuit consisted of a voltmeter in parallel across the test cell 22, and an ammeter connected to the positive side of the cell 22 and to the terminal 24 of a coulometer 26. A fixed resistor 28 completes the circuit between the cell 22 and the coulometer 26. In obtaining the test results listed in the table, 50 percent KOH was used as the electrolyte. The various fuels were first dissolved in water and were then placed in the hydrogen electrode. In each case the cell functioned as soon as the hydrogen electrode was filled with fuel. The open circuit voltages and the closed circuit voltages, both initial and after one hour on a 10 ma./$cm.^2$ current drain, are reported.

*Table I*

| Compound Name | Open Circuit Voltage | Current Drain (ma./$cm.^2$) | Voltage Closed Circuit | Voltage (Closed Circuit) After 1 Hour |
|---|---|---|---|---|
| Pentaerythritol | .68 | 10 | .61 | .392 |
| Dextrose | .81 | 10 | .78 | .67 |
| Lactose | .77 | 10 | .73 | .65 |

Among various advantages possessed by cells using the foregoing sources of hydrogen as the fuel, as compared with cells using a gas as the fuel, is the fact that such use obviates the need to electrolyte-proof the negative electrodes. In general, however, the cathode should be treated after it is catalyzed, to increase its repellency to electrolyte. This treatment may include (1) electrode immersion in a solution of 1.5 percent by weight paraffin in petroleum ether followed by air drying, and (2) the application of kerosene (B.P. 200° C. to 250° C.) to the inner tubular surfaces of the electrodes. Kerosene should not be applied to the outer (active) electrode surfaces, since high polarization may result.

As used herein, the term "apparent electrode surface area" means the area of the electrode surface measured as if it were a perfectly smooth surface. The term "active surface" means the surface on which the electrochemical reaction proceeds, which surface is in physical contact with the cell electrolyte. The term "active carbon" means carbon having a high surface area.

What is claimed is:

1. In a method of electrochemically producing electricity by providing a fuel cell which comprises an anode, an oxygen gas cathode, an aqueous electrolyte in physical contact with both said anode and cathode, and an external circuit between said anode and cathode, and including the steps of supplying oxygen gas to said cathode and supplying to said anode fuel which electrochemically combines with said oxygen gas to form water; the improvement which comprises making said anode of active carbon at least on the active surfaces thereof and depositing on said carbon a metal catalyst selected from the group consisting of the platinum family metals, iron, nickel, and mixtures thereof to the extent of about ¼ to 8 milligrams per centimeter square of apparent surface area, and supplying directly to said anode a fuel consisting essentially of a member of the group consisting of sugar and pentaerythritol dissolved in water, which fuel by dissociation provides hydrogen ions without hydrogen molecules at the surface of said anode.

2. The improvement defined in claim 1 wherein said metal catalyst is a mixture consisting of about 20 to about 80 percent by weight rhodium and about 80 to about 20 percent by weight palladium.

3. The improvement defined in claim 1 wherein said metal catalyst is at least one of the platinum family metals.

4. The improvement defined in claim 1 wherein said improvement includes depositing on said carbon the pyrolysis product of a heat-decomposable heavy metal salt and an aluminum salt.

5. The improvement defined in claim 1 wherein said fuel is dextrose.

6. The improvement defined in claim 1 wherein said fuel is lactose.

References Cited by the Examiner

UNITED STATES PATENTS

| 1,243,111 | 10/1916 | Sanders | 136—86 |
| 2,384,463 | 9/1945 | Gunn et al. | 136—86 |
| 2,860,175 | 11/1958 | Justi | 136—86 |
| 2,925,454 | 2/1960 | Justi et al. | 136—86 |
| 3,097,974 | 7/1963 | McEvoy | 136—120 |

FOREIGN PATENTS 199,736   6/1923   Great Britain.

WINSTON A. DOUGLAS, *Primary Examiner.*

JOHN H. MACK, *Examiner.*

H. FEELEY, *Assistant Examiner.*